March 20, 1934.  P. GANGLER  1,951,572
MACHINE FOR FILLING AND CLOSING BAGS
Filed Feb. 25, 1931   15 Sheets-Sheet 4
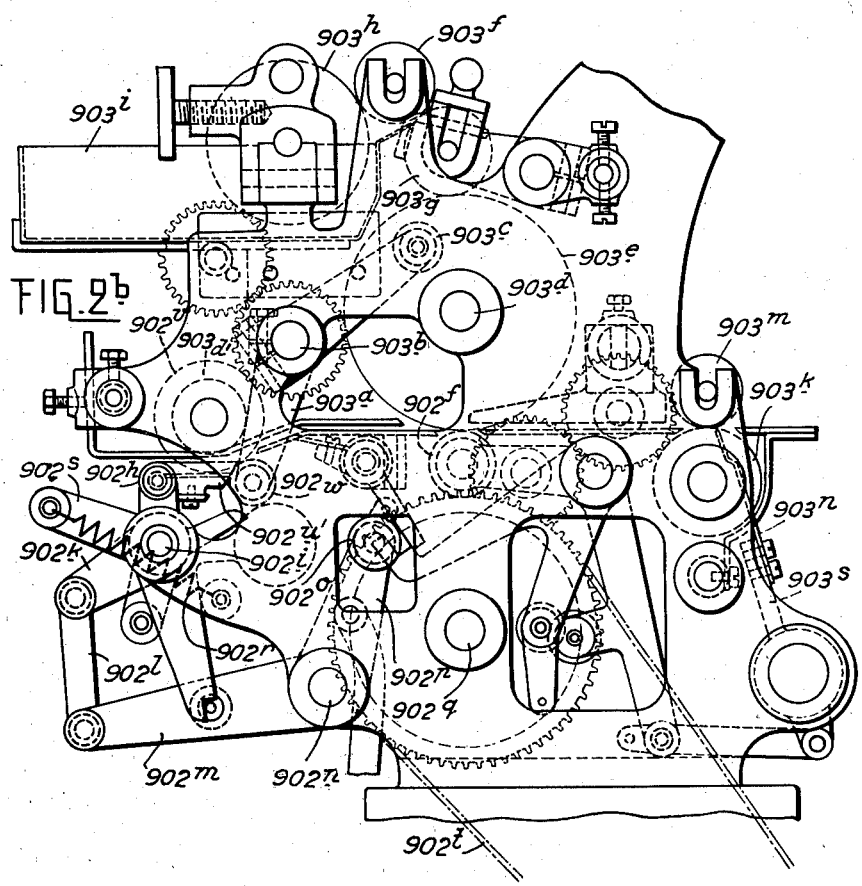
Paul Gangler
INVENTOR:
By Otto Munk
his Attorney.

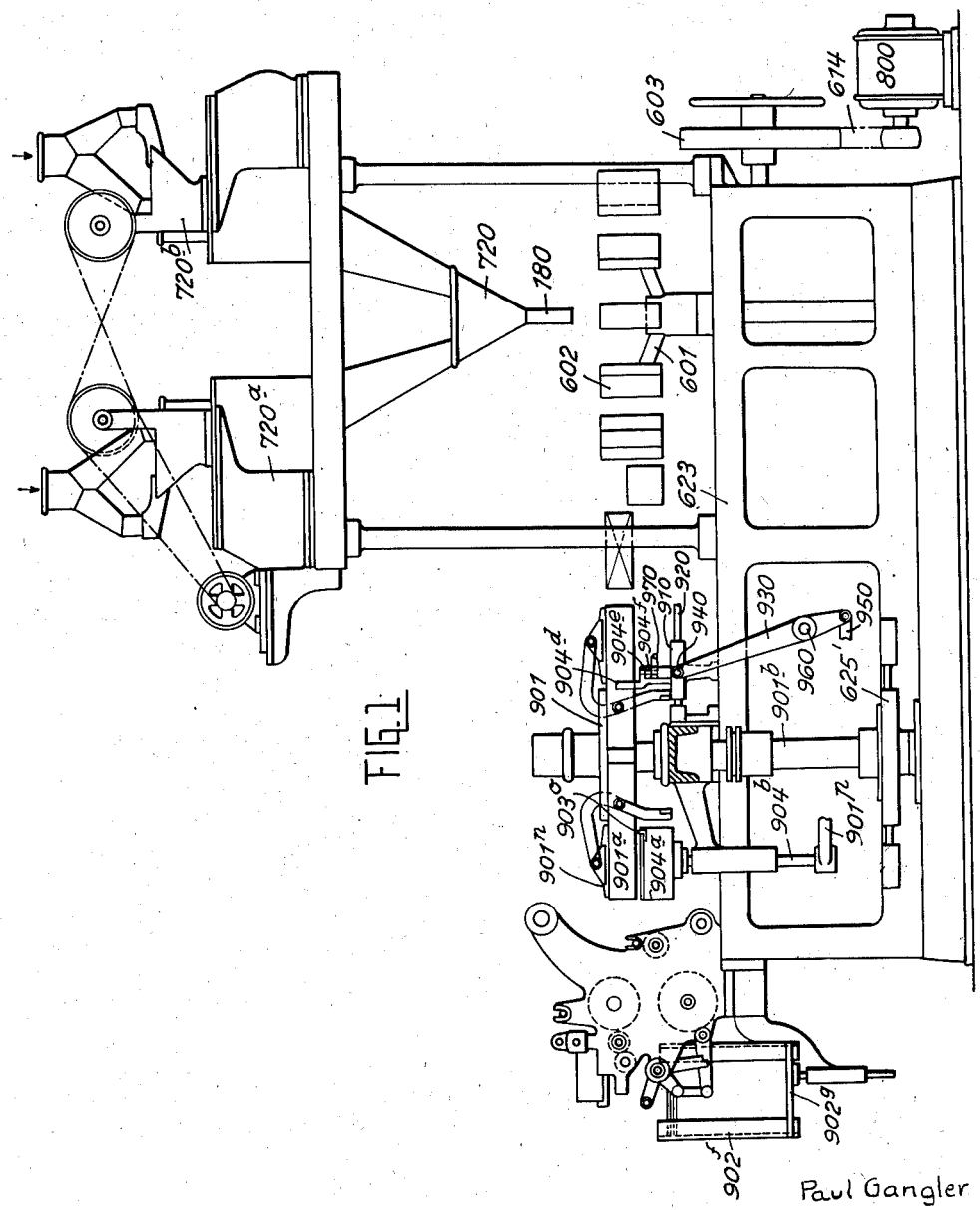

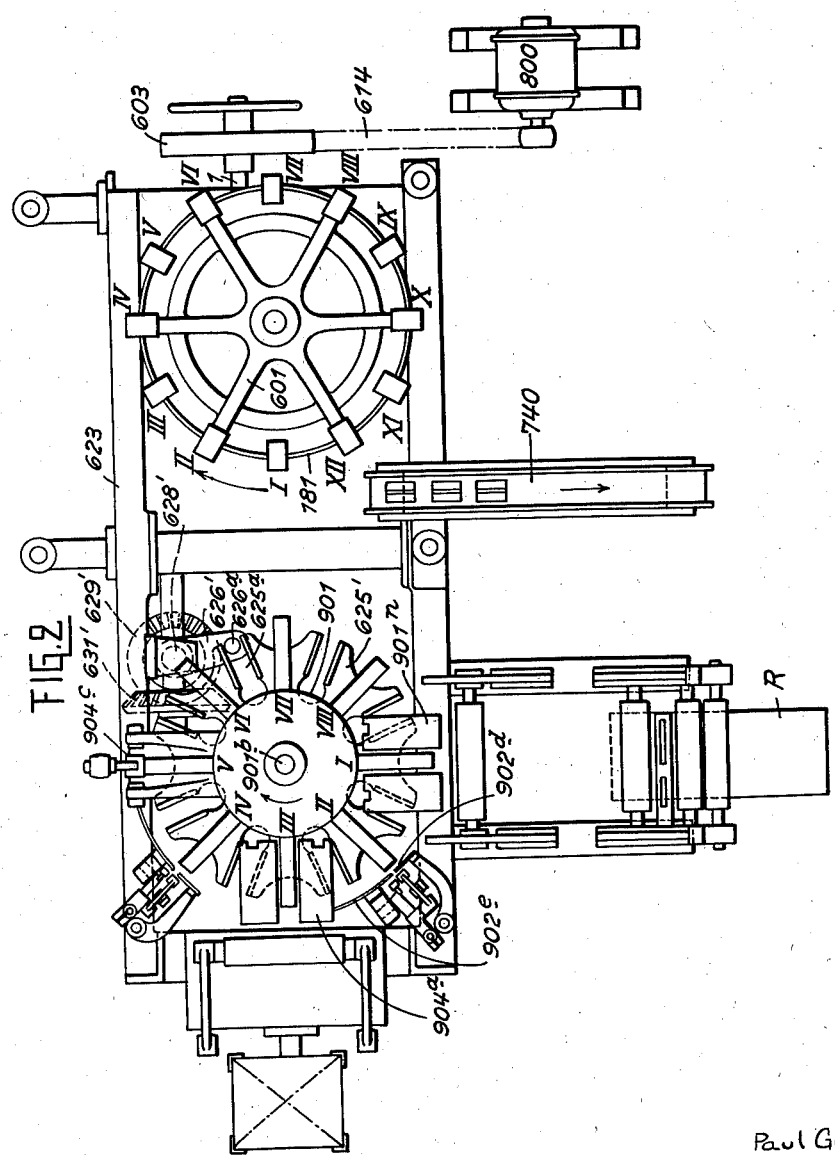

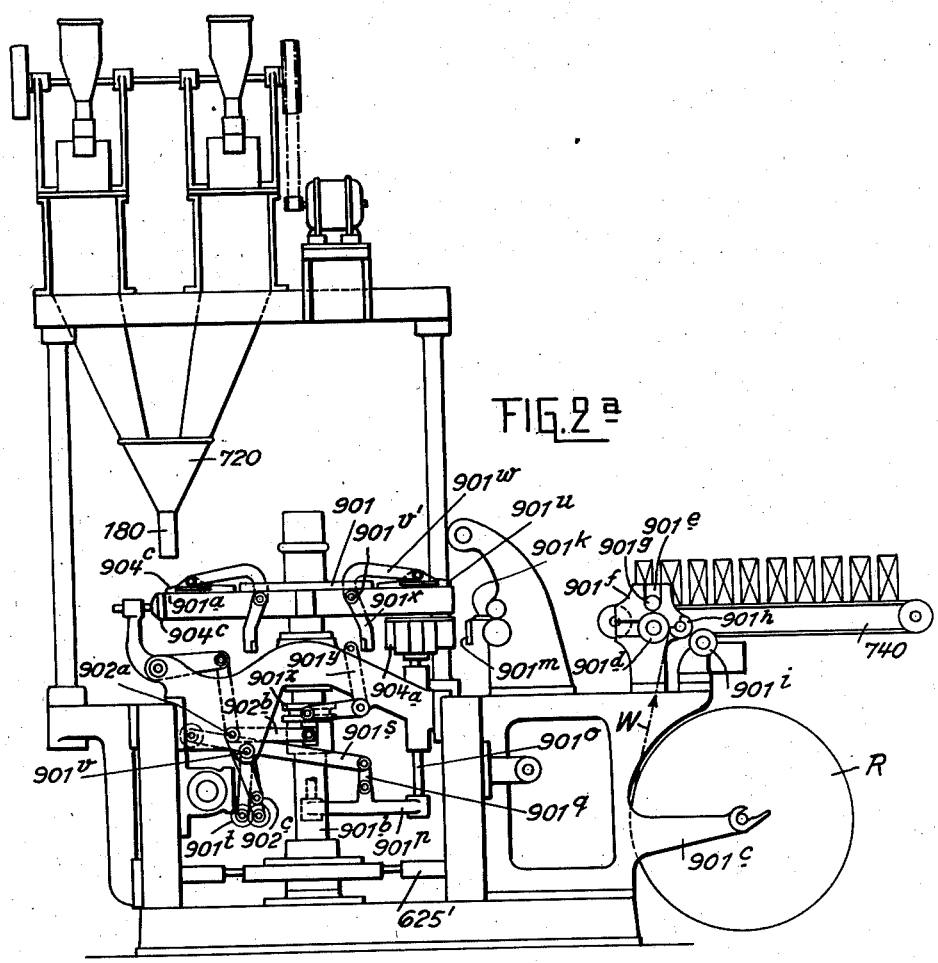

March 20, 1934. P. GANGLER 1,951,572
MACHINE FOR FILLING AND CLOSING BAGS
Filed Feb. 25, 1931 15 Sheets-Sheet 5

Paul Gangler
INVENTOR:
By
his Attorney

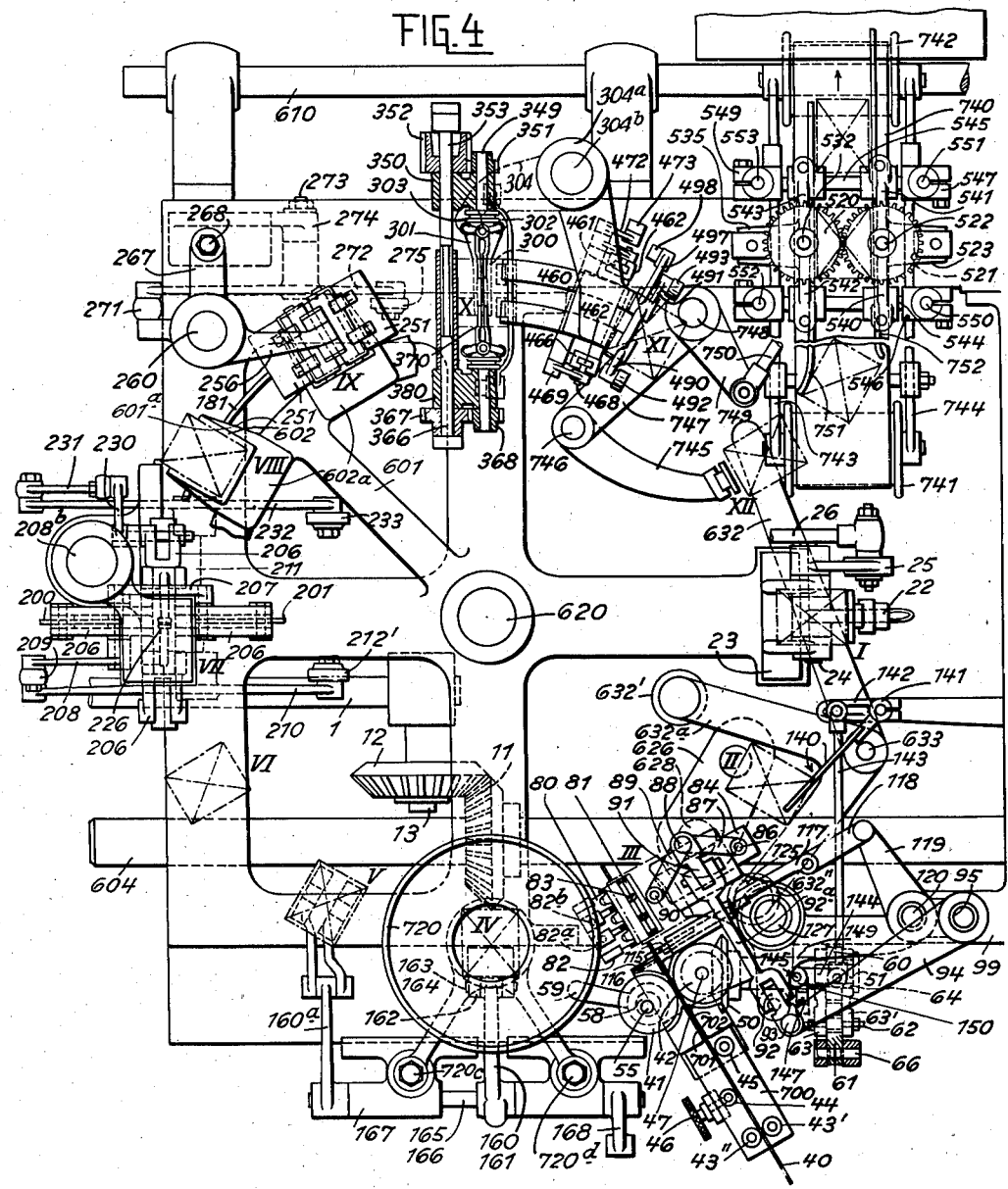

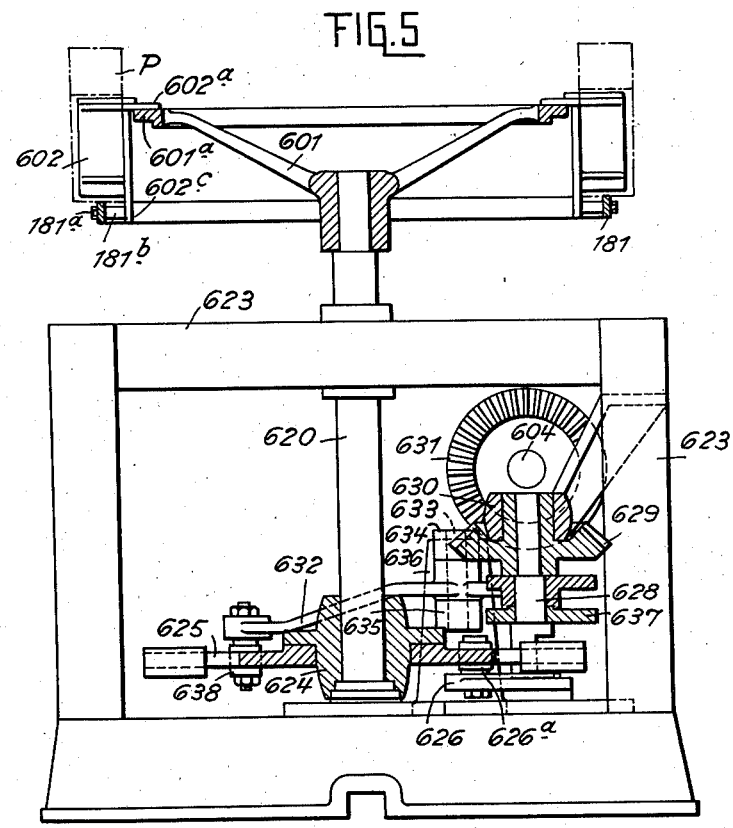

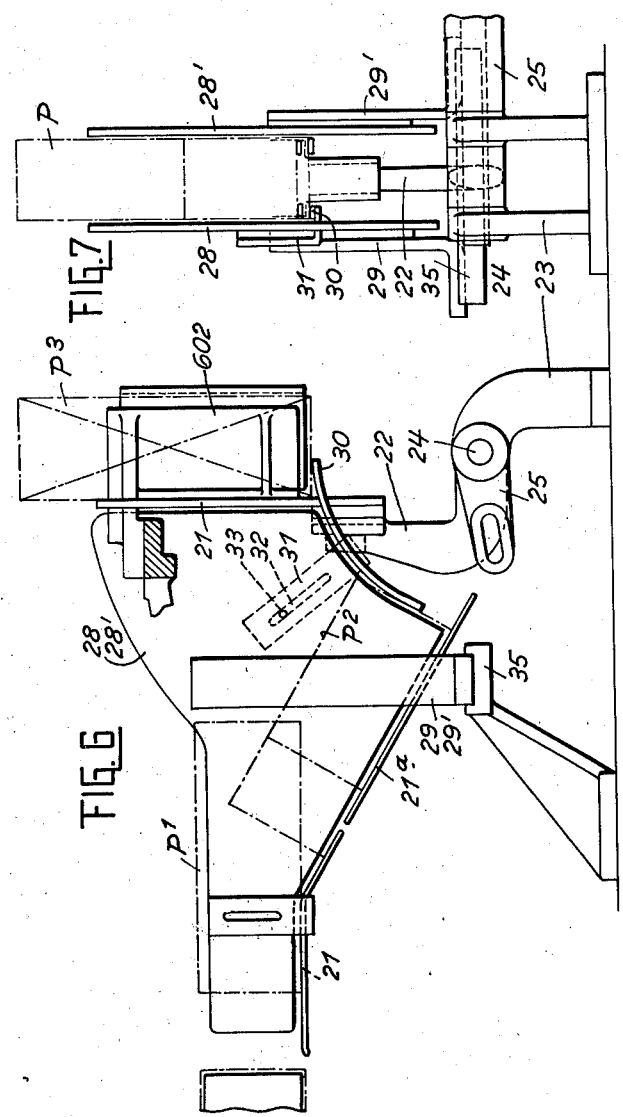

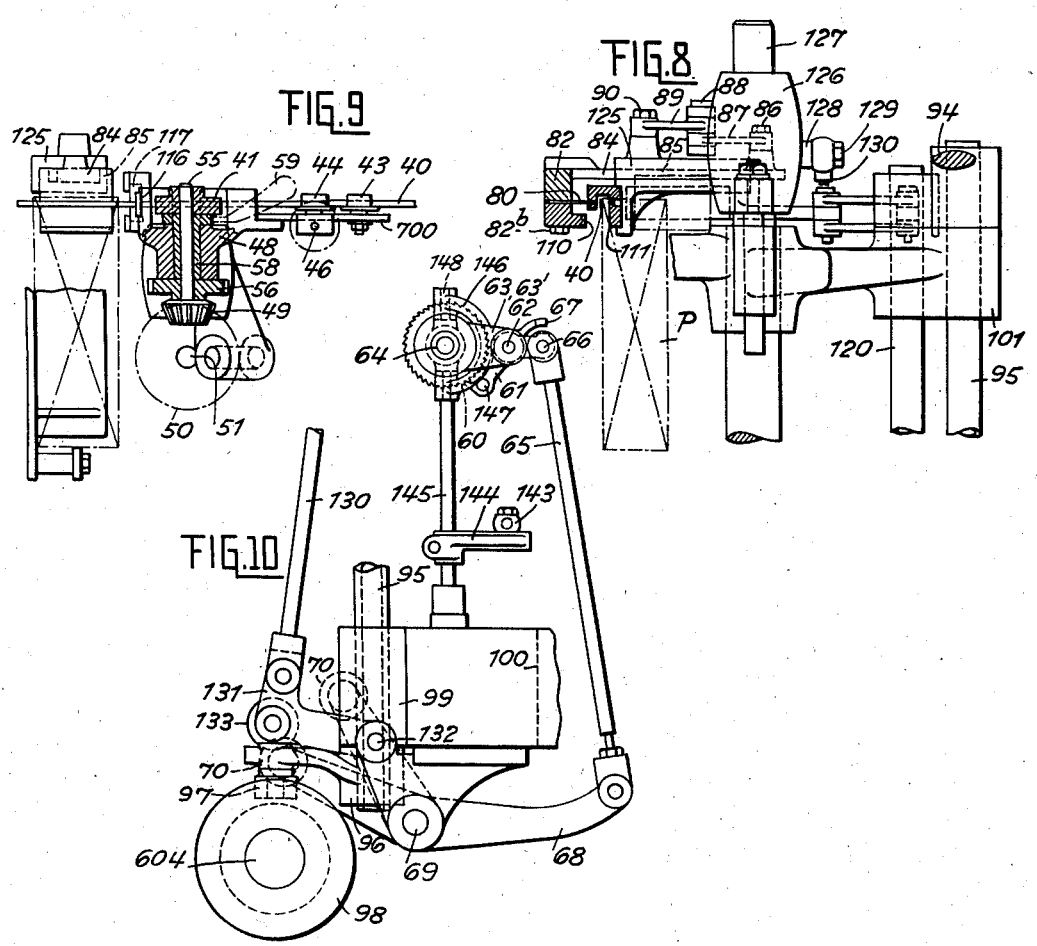

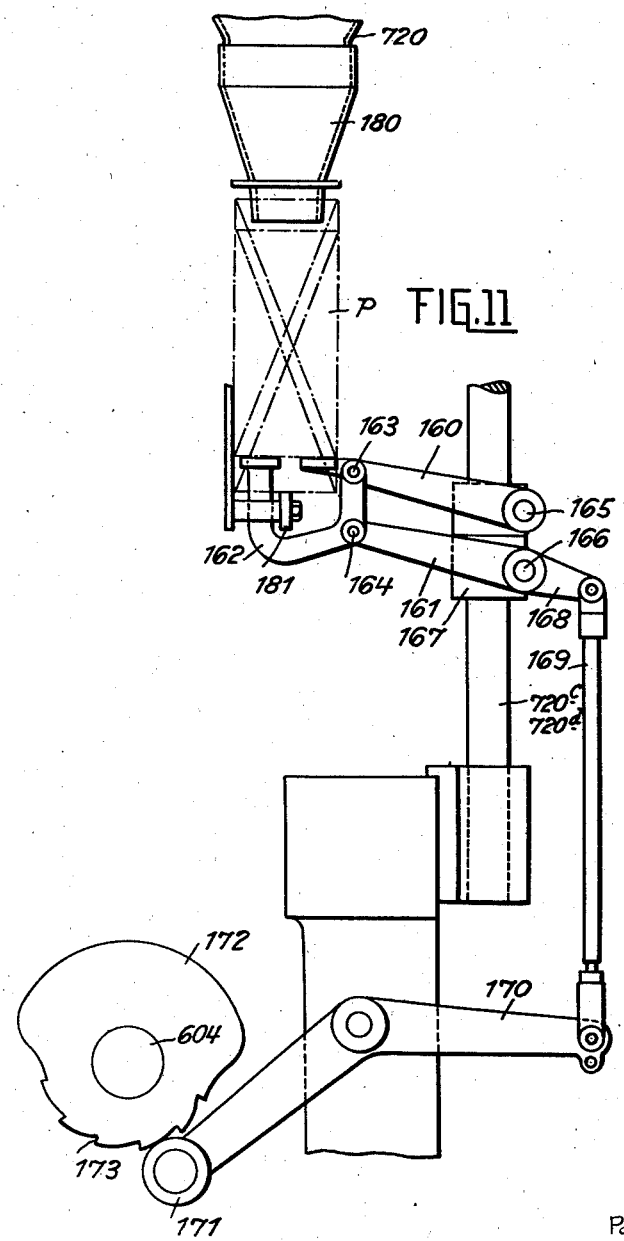

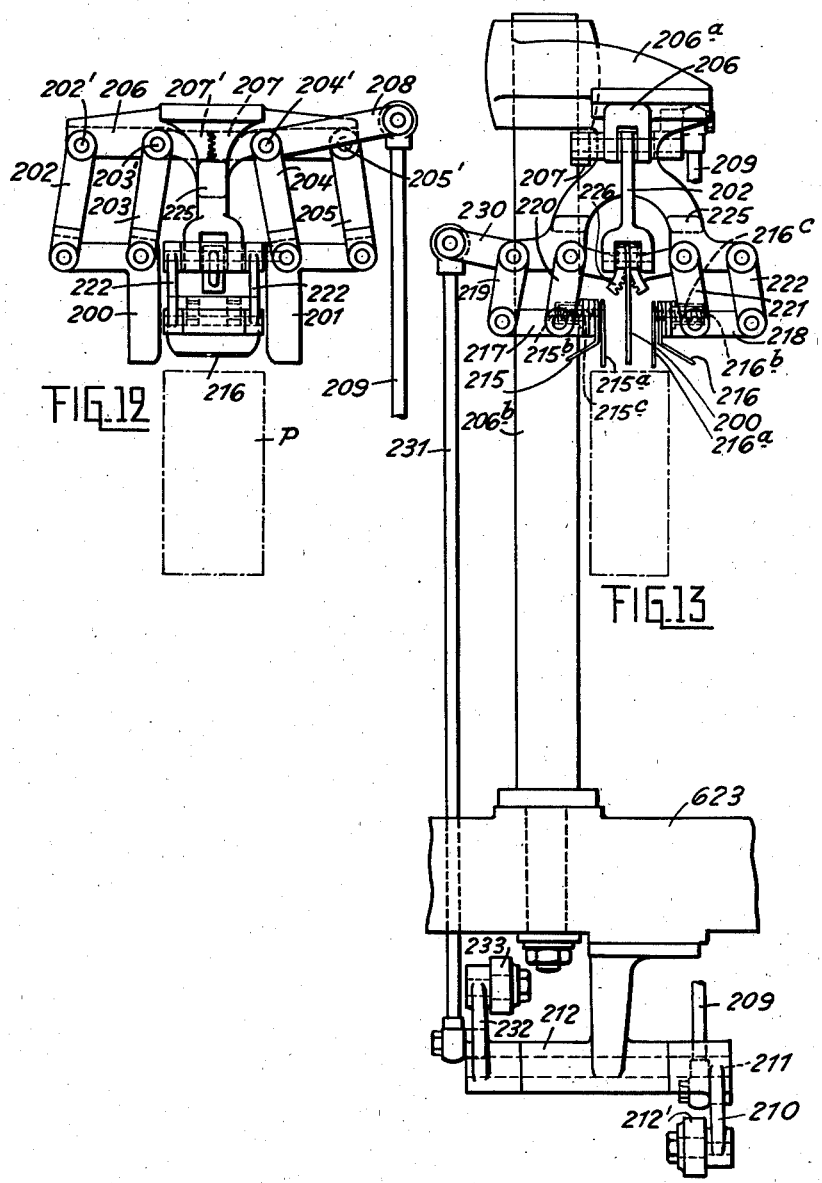

March 20, 1934.   P. GANGLER   1,951,572
MACHINE FOR FILLING AND CLOSING BAGS
Filed Feb. 25, 1931   15 Sheets-Sheet 12
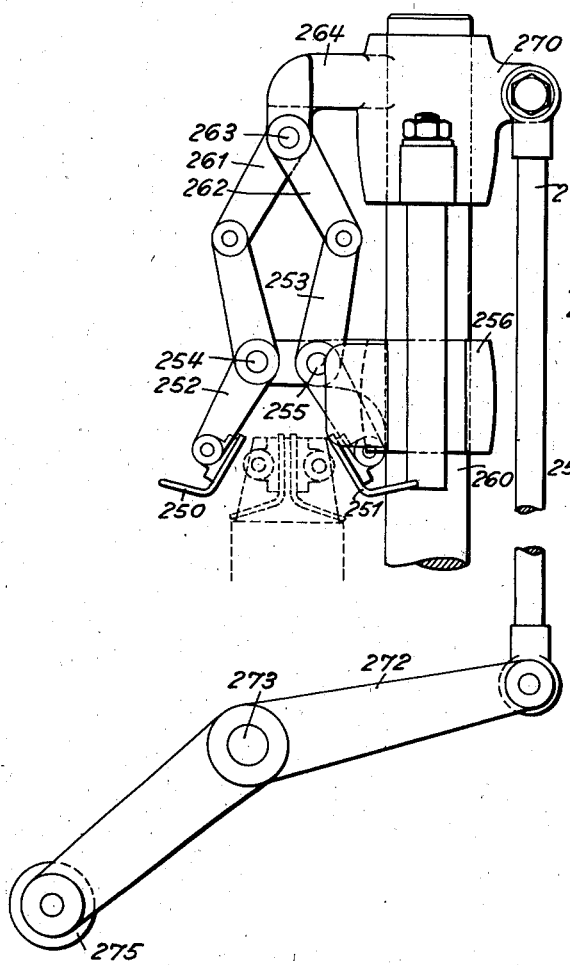
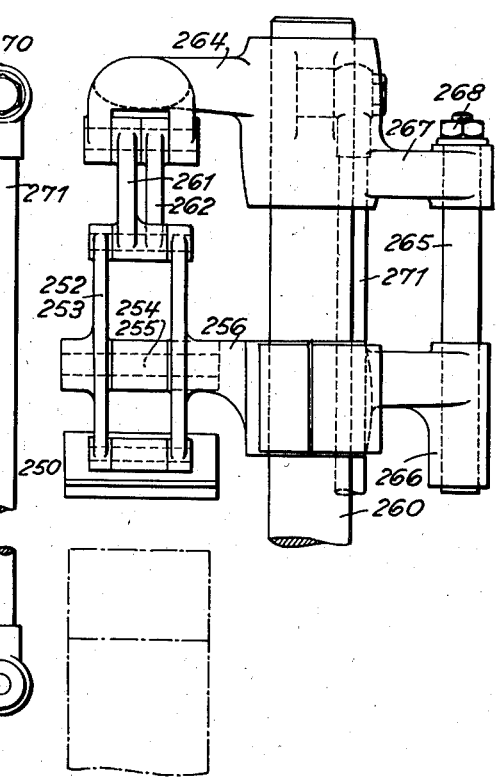
Paul Gangler
INVENTOR:
By
his Attorney.

March 20, 1934.  P. GANGLER  1,951,572
MACHINE FOR FILLING AND CLOSING BAGS
Filed Feb. 25, 1931  15 Sheets-Sheet 13
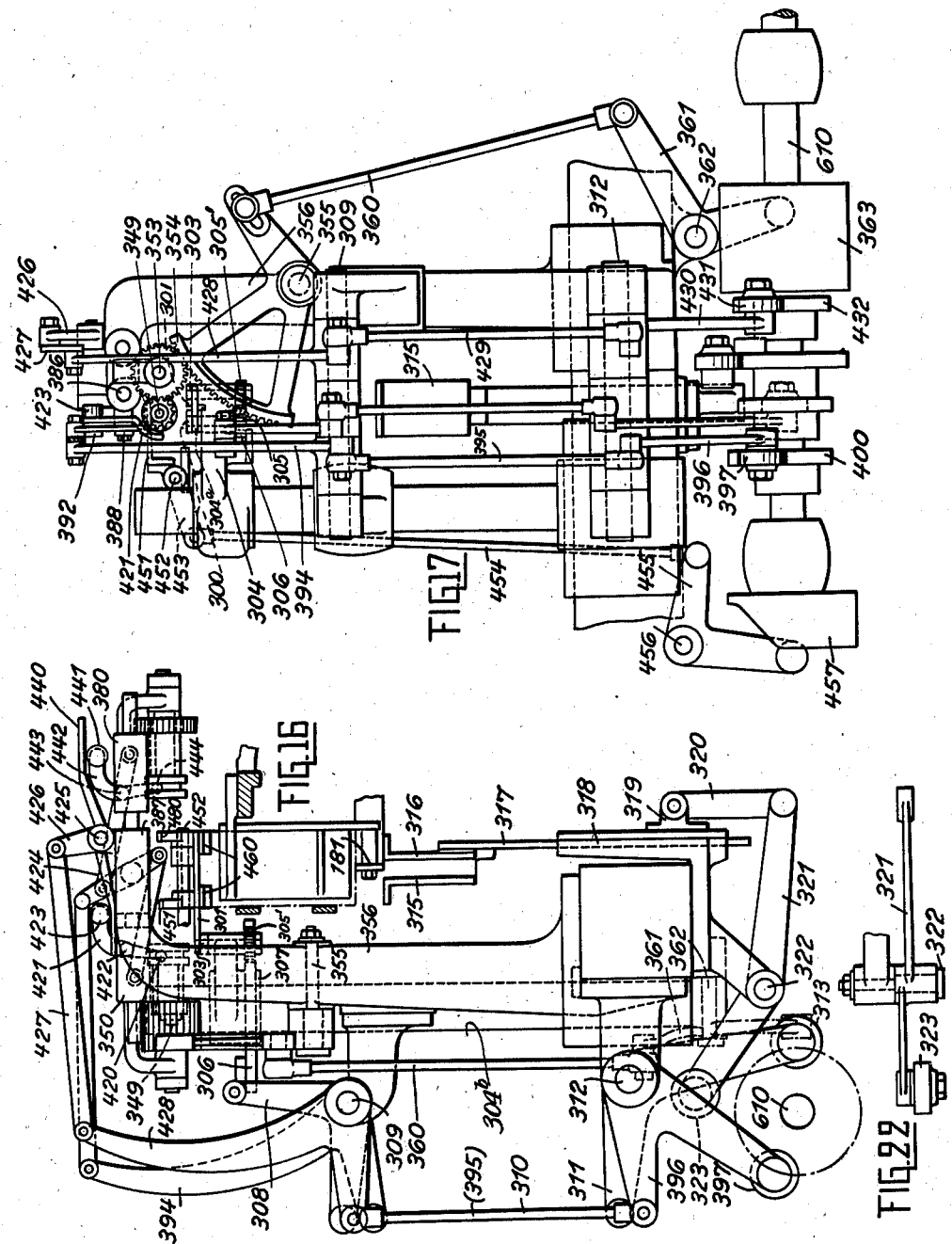
Paul Gangler
INVENTOR:
By
his Attorney.

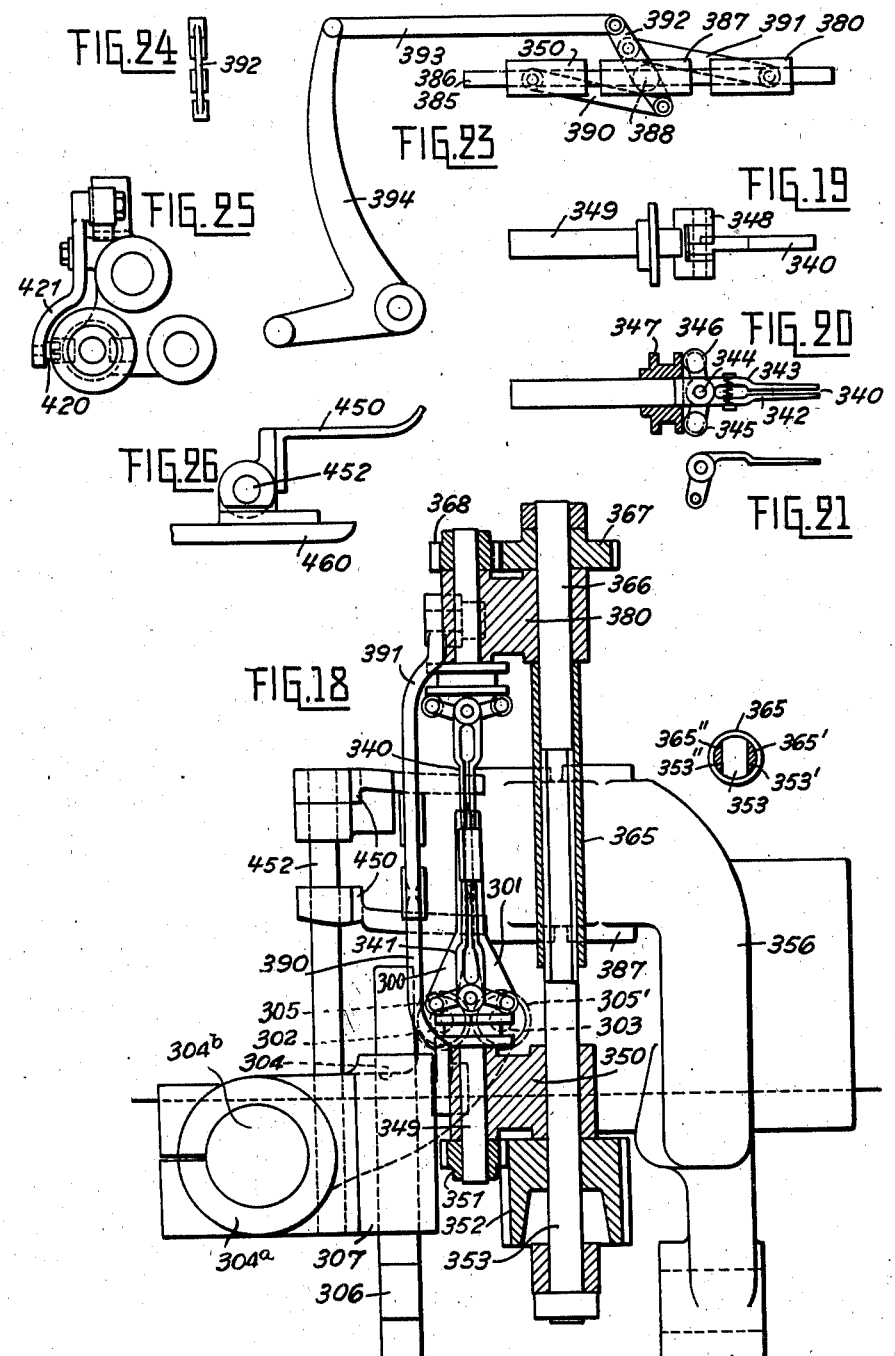

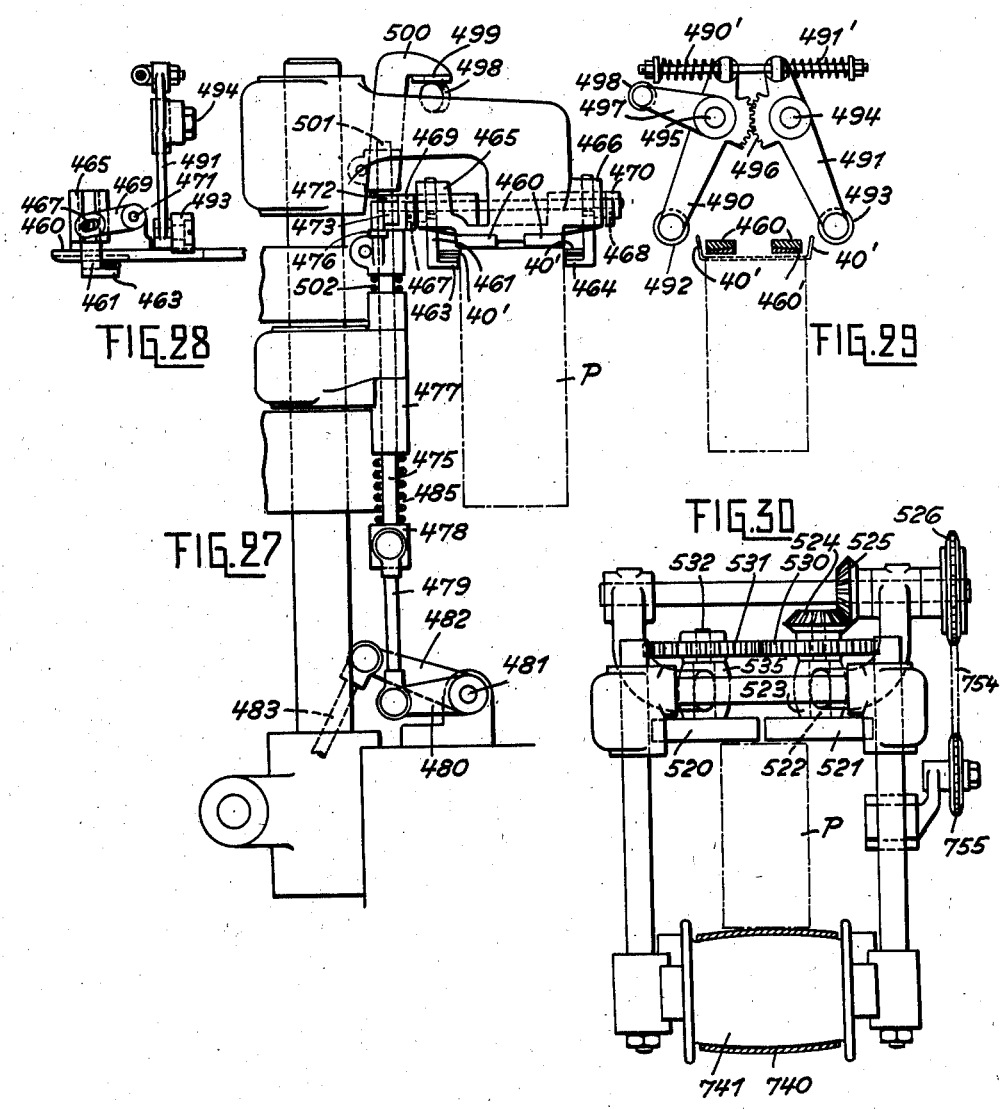

Patented Mar. 20, 1934

1,951,572

UNITED STATES PATENT OFFICE 1,951,572

MACHINE FOR FILLING AND CLOSING BAGS

Paul Gangler, Esslingen, Germany, assignor to the firm Fr. Hesser, Maschinenfabrik-Aktiengesellschaft, Stuttgart-Cannstatt, Germany Application February 25, 1931, Serial No. 518,161

22 Claims. (Cl. 93—6)

The invention relates to the filling and closing of bags of paper or similar material, which bags may consist of one or a plurality of wrappers or envelopes.

Figure 3:
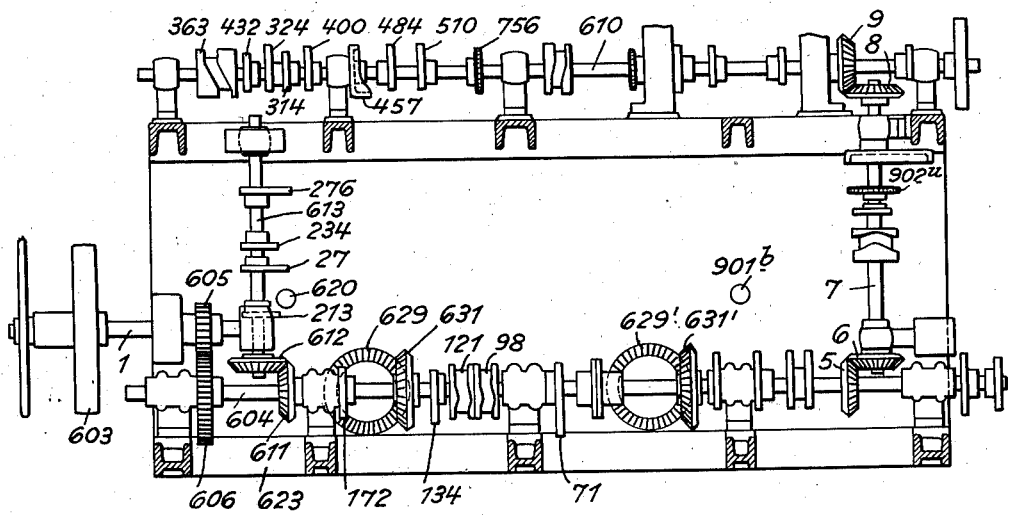
Figure 31:
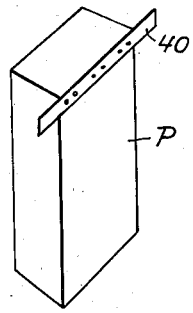
Figure 32:
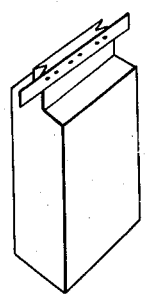
Figure 33:
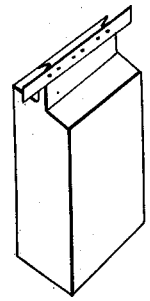
Figure 34:
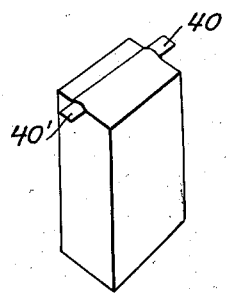
Figure 35:
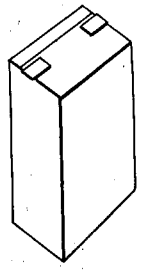
Figure 36:
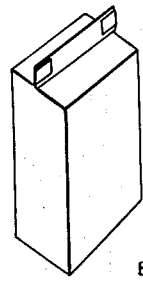

An essential object of the invention is to effect the closure of the bag by merely flattening down and folding the empty portion of the filled bag projecting beyond its contents, the seal being maintained without the aid of an adhesive by employing an elastic flexible strip of metal or other suitable material which affords sufficient hold to the folded portion and the projecting ends of which are turned over to prevent the seal from becoming undone. Further objects and features of the invention relate to a machine for effecting the said closure of the bags. These and other features of the invention will be more fully described as the specification proceeds with reference to the drawings affixed to the specification and forming part thereof, in which one embodiment of my invention is illustrated by way of example. In the drawing Fig. 1, a side view, and Fig. 2, a plan of the complete machine, both in diagram, Fig. 2a, a front elevation of Fig. 1, Fig. 2b, a side-elevation, on a large scale, of the device for feeding the outer sheets of paper to the bag making mechanism of the machine, Fig. 3, a total plan view of the driving shafts with cams, Fig. 4, on a larger scale, a plan of the various working stations of the filling and closing mechanism of the machine, Fig. 5, the conveyor of the filling and closing mechanism together with their drives, in sectional side-elevation, Fig. 6, a side-elevation of the means for conveying the bags to be closed to the conveyor mechanism for the filling and closing mechanism, Fig. 7, the front elevation of this means, Fig. 8, the mechanism for conveying and attaching the metal strip to the edge of the bag, Fig. 9, this mechanism in side-elevation, Fig. 10, the drive of this mechanism in elevation, Fig. 11, the apparatus for jolting the filled bags, in elevation, Fig. 12, the mechanism for creasing and folding the empty top portion of the bag, in side-elevation, Fig. 13, a front elevation of this mechanism, Fig. 14, a side-elevation of the apparatus for finally pressing down the folded upper empty portion of the bag, Fig. 15, a front-elevation of Fig. 14, Fig. 16, the rolling-up mechanism for folding up the pressed closing portion of the bag, Fig. 17, a front-elevation of Fig. 16, Fig. 18, part of Fig. 16 in elevation, Figs. 19 to 26, details of the mechanism shown in Figs. 16 to 18, Fig. 27, the mechanism for bending upwards the projecting ends of the metal strip, in side-elevation, Fig. 28, a front elevation of a portion of Fig. 27, Fig. 29, the mechanism for folding down the upright ends of the metal strip down to the filled bag, Fig. 30, a mechanism for pressing the folded down ends of the metal strip, and Figs. 31 to 36, the various stages in the process of closing the bag.

The drive of the machine takes place from the main shaft 1, which is in the known manner, for instance by a pulley 603 and belt 614, continuously rotated by a suitable electric motor 800. On the driving shaft 1 is mounted the spur wheel 605 meshing with the spur wheel 606 of the shaft 604. The rotation of this shaft is transmitted to the transverse shaft 7 by means of the bevel wheels 5 and 6 and from this shaft to the shaft 610 by means of bevel wheels 8 and 9. From the shaft 604 is driven the shaft 613 through the bevel wheels 611 and 612. On the shafts 604, 7, 610 and 613 are mounted the peripheral and cylindrical cams hereinafter described for operating the various mechanisms of the machine.

The bags to be filled may be produced on any bag-making machine of suitable construction and in the usual manner. In the present case, the bag-making machine is, however, directly combined with the bag-filling and closing machine so that these two machines form a self-contained unit. In this way, the construction and more particularly the drive of the combined machine is considerably simplified and cheapened, and at the same time a considerable amount of floor space saved. The bag-making machine itself is well-known in the art and serves in the present case to manufacture the bag in likewise well-known manner of an inner and outer sheet of paper, envelope or wrapper. For this purpose, a mechanism with eight folding mandrels 901a mounted on a wheel 901 secured to the shaft 901b is, for instance, used. This shaft is from the shaft 604 set in stepwise or intermittent motion in the direction of the arrow of Fig. 2, so that the folding mandrels 901a reach in succession the various working stations of the bag-making machine.

The conveying mechanism of the bag filling and closing machine consists in the case illustrated also of an intermittently rotated wheel 601, Fig. 5, which is equipped with a suitable number of receptacles for receiving and holding the bags P. The conveyor receptacles have the shape of pockets 602 closed at three sides and open at the outside and fixed by means of flanges 602$^a$ upon the rim 601$^a$ of the wheel 601. At the bottom, the bags in the receptacles 602 are resting upon a hoop-shaped rail 181, which by means of screws 181$^a$ and spacing bushings 181$^b$ is secured to the downwardly projecting extensions 602$^c$ of the receptacle rear walls. The conveyor wheel 601 is keyed on to the shaft 620 journaled in suitable bearings of the machine-frame 623. At the lower end of this shaft 620 is by means of the hub 624 mounted Maltese cross wheel 625 of well known construction and driven by a crank 626. The crank is secured to the shaft 628 which at its upper end carries the bevel wheel 629 whose hub freely turns in the bearing 630. The bevel wheel 629 is driven by the bevel wheel 631 mounted on the shaft 604. The crank 626 engages during its rotation with its bowl 626$^a$, in known manner, successively with the radial slots 625$^a$ of the Maltese cross 625 and thus turns it stepwise. After each step, the Maltese cross 625 is arrested by the lever 632 which is adapted to rock around the bolt 633 rotatably journaled in the eyes 634 and 635 of the bearing pedestal. One end of the arresting lever designed as bell-crank 632$^a$ runs with two anti-friction bowls 632' and 632'' in the groove of the cam 637 mounted upon the shaft 628. After each forward step of the Maltese gear, the arresting lever 632 engages with its bowl 638 the radial slot 625$^a$ of the Maltese cross 625 at the time located opposite said slot, all as well known in the art.

The drive of the folding mandrels 901 takes place in exactly the same manner by the bevel wheel 631' mounted on the shaft 604, and the bevel wheel 629' mounted on the shaft 628', Fig. 2, through the agency of a crank 626' turned by the shaft 628', which in its turn intermittently rotates the Maltese gear 625' mounted on the shaft 901. In the same way as described for the Maltese gear 625 of the conveyor wheel 601, there is also provided an arresting or braking lever for the Maltese gear wheel 625', which is arranged and operated in a similar manner as the arresting lever 632 of the Maltese gear 625, so that it is not necessary to illustrate and describe it in detail.

The paper for the inner envelope of each bag is in well-known manner cut off a continuous web W which is unwound from a reel of paper R journaled in a suitable bracket 901$^c$. The withdrawal of the paper web takes place in the customary manner by an intermittently rotated roller 901$^d$ upon which rests a roller 901$^g$ journaled and adapted to displace in the vertical slots 901$^e$ of the frame 901$^f$. The roller 901$^d$ is on its circumference provided in the well known manner with ribs or similar projections which are coated with an adhesive by the roller 901$^h$ contacting with the roller 901$^i$ revolving in the tank containing the adhesive, and apply the adhesive to the desired places of the paper web. Every time the web W is advanced by the desired length of a paper sheet, the paper for the inner envelope is severed from the web by the knives 901$^k$ and 901$^m$, of which the knife 901$^k$ is stationary and the knife 901$^m$ is adapted to be reciprocated vertically. This paper sheet is cut off on a folding box 901$^n$.

By the upward motion of the folding box 904$^a$, which possesses the well-known shape of a U-formed trough, by means of the rod 901$^o$, crosshead 901$^p$, guide rod 901$^q$, bell-crank lever 901$^s$ pivoted at 901$^v$, guide-roller 901$^t$ and an eccentric upon the shaft 610, the sides of the cut off paper sheet are folded in known manner around the circumference of the mandrel 901$^a$ whereupon, likewise in known manner, by means of suitable lateral folding slides the two upward projecting longitudinal edges of the now U-shaped sheet are folded down upon the top side of the mandrel, first the edge not provided with the adhesive and then that provided with the adhesive. During this folding operation, the presser plunger 901$^u$ of well-known construction is being raised by means of the lever 901$^w$, 901$^x$ pivoted at 901$^{v'}$ which has been turned upwards by double lever 901$^y$. The control of the lever 901$^y$ is effected by a sleeve 901$^z$ adapted to be moved up and down upon the shaft 901$^b$ by means of the double lever 902$^b$ pivoted at 902$^a$ and the guide roller 902$^c$ from an eccentric mounted upon the driving shaft 610.

After the just described formation of the paper tube or hose, the presser plunger 901$^w$ is lowered upon the upper gummed seam of the said tube, and the folding box 904$^a$ returns into the position illustrated in Fig. 2$^a$, whereupon the mandrel cross is turned forward by one eighth of a complete circle and reaches the station II where the bottom of the inner paper tube or wrapper is formed in well-known manner by the two upper and lower narrow flaps being first folded over by suitable swinging folders and then the lateral closing flap situated at the rear seen in the direction of rotation by means of folder 902$^d$. The folding over of the last closing flap takes place during the next forward motion of the mandrel wheel from the station II to the station III by means of a stationary folder 902$^e$ as is also well known.

When the mandrel 901$^a$ has reached the station III, the folding over of the outer paper wrapper takes place. The sheets or leaves serving for the formation of said outer paper wrapper, are piled up in a receptacle formed by angles 902$^f$ and provided with a bottom 902$^g$ which gradually ascends to the top as is well-known in the art. The withdrawal of the uppermost sheet for the time being takes place first by raising the front edge of said sheet by means of a rocking suction device. This device consists of a suction pipe 902 connected with an appropriate air pump of well known construction and which is mounted with its downwardly cranked opposite ends upon the shaft 902$^i$. The rocking of the shaft 902$^i$ takes place by means of the crank 902$^k$, guide rod 902' and arm 902$^m$ on the rotatable pin 902$^n$ which is controlled by a second arm 902$^p$ mounted upon said pin and provided with a guide roller 902$^o$ from a suitable eccentric of the shaft 902$^q$ against the resistance of a spring indicated at 902$^x$ of the arm 902$^s$ mounted upon the shaft 902$^i$. The drive of the shaft 902$^q$ takes place continuously by the chain gear 902$^t$ from the sprocket wheel 902$^u$ mounted on the shaft 7.

The rocking suction tube 902$^h$ is provided with a suitable number of suction branches 902$^{u'}$, for instance four. During the upward motion of the said suction branches, the front edge of the sheet is brought into contact with a roller 902$^v$ which is continuously rotated and with which cooperates a roll 902$^w$ which by means of arms 903$^a$ arranged at both sides is adapted to be oscillated around a pin 903$^b$, the arms 903$^a$ being provided with guide rollers 903$^c$ cooperating with appropriate eccentrics upon the shaft 903$^d$ which is rotated by any suitable and known means. The roller 902$^v$ is provided with circumferential grooves 903$^{d'}$ into which the suction heads 902$^u$ are allowed to enter during their upward motion.

When the front edge of the sheet has been placed against the continuously revolving roller 902$^v$ by means of the said suction heads, the roller 902$^w$ is swung against said roller 902$^v$ and by cooperation of the said two rollers the sheet of paper is conveyed from the pile between a gumming roller 903$^d$ rotated by the spindle 903$^e$, and a rocking counter-roller 903$^f$ whereupon the roller 902$^w$ returns into its inoperative position. The roller 903$^e$ is provided with suitably arranged ledges for applying adhesive to the desired places of the paper sheet. The application of the adhesive upon the roller 903$^e$ takes place in known manner from the gumming roller 903$^h$ by intermediate rollers 903$^f$ and 903$^g$. Roller 903$^h$ is rotated in the receptacle 903$^i$ containing the gum or the like by suitable gears.

From the said adhesive roller the envelope passes between conveyor rollers 903$^k$ and 903$^m$ the latter resting upon the former which is driven by suitable and known means.

The envelope is conveyed at station III upon the usual U-shaped folding box 904$^a$ after leaving the conveyor rollers 903$^k$, 903$^m$ by fingers 903$^n$ arranged at both sides up to the stationary but adjustable stops 903$^o$ so that it rests upon the folding box 904$^a$ always in the correct position. The fingers 903$^n$ are mounted upon an arm 903$^s$ to which a reciprocating motion is imparted by suitable known means. At the station III, the outer envelope is wrapped as a tube around the inner envelope upon the mandrel 901$^a$ in a similar manner as above described with reference to station I. The folding box 904$^a$ is operated simultaneously with the folding box 901$^n$ of the station I by the rod 904$^b$ from the cross-head 901$^p$ and likewise the longitudinal seam presser 901$^n$ in a similar manner and by the same drive as at station I.

As the mandrel is turned forward, the formation of the bottom of the wrapper takes place at the station IV and between the stations IV and V in a similar manner as above described and illustrated for the inner envelope. At station V, the bottom is pressed down in known manner by a plunger 904$^c$ in the well known manner. After, at station VI, a repeated pressing down of the bottom has taken place, if desired, the bag reaches the station VII where the discharge of the bag consisting of the inner and outer wrapper and closed at the bottom takes place by means of hooks 904$^d$ fixed upon arms 904$^e$ and adapted to pass into the interior of the mandrel through suitable lateral longitudinal slots in the circumference of the mandrel.

The arms 904$^e$ are pivoted upon bolts 904$^f$ of a carriage 910 and may be turned against the sides of the mandrel. The carriage is adapted to slide upon a bolt 920 and to be operated by a lever 930 by means of a slide-link block of the bolt 940. The lever 930 is pivoted at 960 and is driven by a link 950 from a suitable eccentric upon the shaft 7. The hooks 904$^d$ are controlled by a spring 970 which has the tendency to pull them into the said lateral slots of the mandrel.

When the respective mandrel arrives at station VII, the hooks are in their outer position and are then turned into the lateral slots of the sides of the mandrel by the spring 970 so that they engage at the rear edge of the bag and slip the bag off the mandrel when now the carriage 910 is moved towards the outside, and convey it, according to Fig. 6, into the position indicated by P' upon a plate or rail 21 which is inclined in such a manner that the bag will automatically adapt the inclined position indicated by P$^2$.

As a continuation of the plate 21 there is arranged a plate 21$^a$ which is mounted on a rocking arm 22. This arm is journaled in the bracket 23 fixed on the machine frame, by means of shaft 24, see also Fig. 4. On the shaft 24 is also keyed the driving crank 25 operated by the connecting rod 26 from the cam 27 on the shaft 613, Fig. 3. By the swinging motion of the plate 21$^a$ the bag is brought into the vertical position P$^3$ of Fig. 6 and simultaneously conveyed into the receptacle 602 at station I of the bag filling and closing apparatus. There are on the right-hand side and left-hand side provided lateral guide walls 28, 28' mounted on the angles 29 and 29', the lower legs of which are secured to a pedestal 35 of the machine framing. The slotted and curved bottom sheet 30 secured to the angle 31 serves as lower guide for the bags to be placed into the upright position. The angle 31 is by means of the screw 33 and the slot 32 adjustably mounted on the sidewall 28.

During the stepwise advance of the conveyor wheel 601, the bag passes first from station I to the station II and then to the station III, where a resilient and easily flexible metal strip, preferably pasted with an envelope of paper, is fed forward and affixed to one side of the upper edge of the bag, see in particular Figs. 4, 8, 9 and 10.

The said strip 40 to be affixed to the bag is drawn off a suitable magazine roller, not shown, by feed rollers 41 and 42. It is straightened out by the drawing rollers 43', 43'', 44 and 45 rotatably mounted on the table 700 and stretched. The rollers 43', 43'' and 45 are stationary, but adjustable, while the roller 44 is adjustable in relation to the rollers 43 and 45 by means of an adjusting screw 46, at right angles to the direction of feed of the metal strip, for the purpose of bending the strip lightly along its path between the rollers 43 and 45, in order to obtain a certain amount of stretch. The drawing roller 42 is mounted upon the shaft 47, which in the same manner as shown in Fig. 9 for the preliminary drawing roller 41, is rotatably journaled in the bracket 48. Upon the lower end of the shaft 47 is keyed a bevel wheel 49 meshing with the bevel wheel 50 mounted on the shaft 51. The drawing roller 41 is secured upon the shaft 55. At the lower end of this shaft is fixed the spur wheel 56 which gears with a corresponding spur wheel, not shown in the drawings, on the shaft 47.

The shaft 55 is journaled in an eccentrically journaled bushing 58, which is provided with a handlever 59. By operating this lever the eccentric bushing 58 is turned through an angle and thus the shaft 55 with spur wheel 56 and roller 41 moved out of the reach of the drive of the shaft 47 and out of contact with the drawing roller 42. This disengagement of the drive serves to facilitate the introduction of the metal strip and to enable to stop the feed in case of a breakdown in the machine.

On the shaft 51 is according to Figs. 4 and 10 mounted a ratchet wheel 60 adapted to be engaged by a pawl 61 pivotally mounted upon the pin 62. This pin is mounted on the two rocking levers 63, 63' rotatably mounted on the hub 64 of the ratchet wheel 60. At the free end of the pawl 61 designed as bell-crank lever is by means of a pin 66 pivoted the driving rod 65. The rocking lever 63 is equipped with the stop 67. At the lower end of the rod 65 there is arranged the cam lever 68 which is adapted to rock upon the stud 69 and carries at its other end a bowl 70 which receives its rocking motion from the cam 71 mounted on the shaft 604.

By this ratchet gear, the drawing rollers are intermittently so rotated that the metal strip 40 is drawn or pushed forward by the drawing rollers 41 and 42 and the parallel guides 701 and 702 located between them, during each rotation of the draw rollers into the path of travel of the individual bags, to such an extent that the leading end of the metal strip extends every time a short distance beyond the front wall of the bag.

The attachment of the strip at the front of the bag may take place in any suitable manner. In the case illustrated, it takes place by punching out tongues of the metal strip and folding them over the paper or riveting the strip to the paper. The punching and riveting apparatus consists, for instance, of the three punches or male dies 80 which cooperate with the female dies 81. The punches are clamped in the carrier block 82 by means of the clamping pieces 82ª and screws 82ᵇ and move in the parallel guides 83 which also act as stripping off devices after the riveting process. The carrier block 82 is attached to a rail 84 which is adapted to reciprocate in the guide 85. At the other end of the rail 84, there is pivotally mounted upon the headed bolt 86 the articulated lever 87, which by the bolt 88 is combined into a toggle joint with the articulated lever 89 pivotally mounted upon the headed bolt 90. The headed bolt 90 is inserted into an eye provided on the stationary supporting member 125. On the bolt 88 there is also mounted a transverse hinge 91 which is connected with the transverse hinge 92 by a rod 92ª. The transverse hinge 92 is through the bolt 93 connected with the lever 94 rigidly mounted on the tube 95. At the lower end of the tube 95, there is fastened a lever 96, Fig. 10, carrying the bowl 97. This bowl engages the groove of the cylindrical cam 98 mounted on the shaft 604. The tube is at its lower end above the lever 96 supported in a bushing 99 of the cross-member 100 of the machine framing and at its upper end journaled in the bearing 101.

In order that the punching or riveting apparatus should not be interfered with during the advance of the bag, it is necessary to keep it during the rotation of the conveyor wheel at such a height that the bag can be fed forward underneath it. As soon as the bag has reached the station III, the entire apparatus is lowered from its upper position by the system of levers described, in such a manner that the dies 81 are located inside the front wall of the bag and the punches or plungers 80 at the outside between the strip 40 fed forward and the front wall of the bag or package. The toggle-joint 87, 88, 89 is then straightened out by the described operating levers, whereby the punches move towards the metal strip, punch the strip at certain places and simultaneously roll up in the well known manner, the stamped out tongues by means of the dies, so that the metal strip is thus riveted to the front wall of the bag. After this process, the punches 80 are withdrawn again and the whole riveting apparatus first slightly raised into an intermediate position, until the press plates 110 and 111, Fig. 8, reach the height of the riveted strip. Then the punching apparatus is again operated, whereby the press plates 110 at the support 82 and the counter-plates 111 of the dies 81 press the riveted joint passed through between them and thus render the joint secure. The mechanism then is returned into its highest position.

Simultaneously with the riveting process, the metal strip is cut off to the length required by the reciprocating knife 115 and the stationary counter-knife 116, Figs. 4 and 9. The movable knife is rigidly joined to a guide-rail 117 adapted to be moved by the pivoted link 118 and the lever 119. The lever 119 is rigidly mounted on the tube 120 which at its lower end is provided with a clamped lever carrying an antifriction bowl, as described in connection with the tube 95, said bowl engaging the groove of the drum-like cam 121 mounted on the shaft 604.

To enable the said raising and lowering motion of the strip riveting apparatus to be carried out, the apparatus is provided with an arm 125 which together with the slide bearing 126 is vertically movable along a piller 127. The slide bearing 126 is provided with an eye 128 engaged by a headed bolt 129 of a pull rod 130. This rod is at its lower end pivotally connected to a lever 131, Fig. 10, which is adapted to rock upon a bolt 132. The lever 131 carries the bowl 135 adapted to cooperate with the cam 134 mounted upon the shaft 604.

In order that in the event of non-arrival of a bag the pulling or pushing forward of the metal strip 40 should not take place, the following stop motion is provided:

A feeler 140 extends sideways from the station II into the feed path of the bags and is turned by them from the position illustrated outwards in the direction of the arrow. The said feeler is rigidly fixed upon the shaft 141 upon which is clamped the arm 142 to which is connected a rod 143. At the other end, said rod is connected to a crank 144, Fig. 10, which is clamped to a spindle 145. With said spindle is rigidly connected a bow 146. The bow 146 is at its upper end adapted to turn around a bolt 148 fitting an eye 150 cast on to the bearing bushing 149 for the shaft 51. The pawl 61 described above carries sideways a roller 147. If a bag fails to arrive, the feeler remains in its inner position shown, and the bow 146 is held in the parallel position to the ratchet wheel 60 by the linkwork described.

At the beginning of each upward motion of the driving rod 65, the pawl 61 turning on the pin 62 is thrown out of engagement with the teeth of the ratchet wheel 60, whereupon the head of the driving rod 65 encounters the stop 67 and thus also swings the levers 63, 63' upwards. In the meantime, the feeler 140 has become operative and in the absence of a package the bow can now swing inwards so that the roller 147 on pawl 61 moves along the outer face of the bow 146. During the downward motion of the driving rod 65 taking place for the purpose of feeding the strip 40 forward, the pawl 61 thus remains out of engagement with the ratchet wheel 60, so that no movement of the rollers 41 and 42 takes place and the strip 40 is not pulled forward. As long as packages are correctly fed forward, the feeler 140 is each time swung out of its inside position and thus turns the bow 146 aside through the linkwork described, so that now during the downward motion of the rod 65 the roller 147 no longer runs on to the outer face of the bow 146 and thus the pawl 61 comes into engagement with the ratchet wheel 60, which is therefore turned through an angle corresponding with the length of the section of the strip to be fed forward.

At station IV, Figs. 4 and 11, is performed in any well known manner the filling of the bags from the hopper 720 and the jolting of the contents of the package or bag. The hopper is, in step with the working of the machine, alternately charged from the measuring apparatus $720^a$ and $720^b$ diagrammatically shown in Fig. 1. This apparatus may have any suitable construction and thus calls for no further description. At the station IV are provided a system of levers 160, 161 arranged in the form of a parallelogram, upon which a U-shaped carrier 162 is mounted by pins 163 and 164. The levers 160, 161 are fixed upon the shafts 165, 166 adapted to rotate in bearings 167 secured to the pillars $720^c$ and $720^d$. The shaft 166 is driven by the crank 168 and the rod 169 which at its lower end is pivotally fixed to the cam lever 170, and by the bowl 171 operated from the cam 172 mounted upon the shaft 604. The cam 172 is provided with teeth 178 which cause a jolting or shaking motion. As soon as the package P has reached the station IV, the measured or weighed material is conducted into the package P from the hopper 720. This package has previously been moved upwards from the above mentioned carrier rail 181 serving as a support for the bottom of the bag, by means of the carrier member 162, so that the mouth-piece 180 of the hopper extends into the open bag. As soon as the filling operation has been finished, the carrier 162 with the package upon it descends, the contents of the bag being simultaneously jolted by the said teeth 173.

Now the filled bag is conveyed to station V where it is subjected to a final jolting action. This is effected in such a way that as just described with reference to the station IV, a system of levers, arranged to form a parallelogram on the shafts 165 and 166 become operative and subject the bag to a jolting motion in the manner described above. The upper of these levers is shown at $160^a$ in Fig. 4.

The station VI remains idle.

When the package has arrived at station VII, the portion of the paper extending beyond its contents is folded or creased inward at two opposite sides and simultaneously flattened down at the two other sides. This operation may be performed by any suitable apparatus, in the present case by the mechanism shown by way of example in Figs. 4, 12 and 13. This mechanism comprises a pair of folding knives 200 and 201 adapted to oscillate from outside towards the inside. The folding knives are bent at their upper ends and are suspended from the forked levers 202, 203, 204 and 205, which in their turn are pivotally mounted at their upper free ends in the bearing 206 by bolts 202', 203', 204' and 205'. The bearing 206 is by means of a bracket $206^a$ mounted upon a pillar $206^b$ which is secured to the machine frame 623. The said levers 202—205 operate in the manner of a parallel guide. On the bolts 203' and 204' are mounted levers with toothed segments 207 and 207', which are in gear with each other. On the bolt 204' there is also fixed a driving crank 208 which is pivoted to the rod 209 hinged at its lower end to the cam lever 210, as shown in Fig. 4. The cam lever 210 is adapted to rock upon the pin 211 inserted in the eye 212. The bowl 212' at the other end of the cam lever 210 stands under the control of the cam 213 on the shaft 613. At right angles to the folding knives 200 and 201, there are arranged folding or press plates 215 and 216 which are adapted to force the folded down walls of the package inwards and against the folding knives 200, 201. At the hereinafter described holding device of the plates 215, 216, there are resiliently mounted spaced parallel plates $215^a$ and $216^a$. These plates are adjustably guided by means of bolts $215^b$ and $216^b$ and controlled by springs $215^c$ and $216^c$.

The folding plate mechanism is, as regards its mode of motion, identical with that of the folding knives. The press jaws 215, 216 bent downwards under an angle are secured to the carrier members 217, 218 and these in their turn to the pairs of levers 219, 220, 221 and 222. At their upper ends, the said pairs of levers are adapted to rock in the bearing 225 mounted on the arm $206^a$. The pairs of levers 220, 221 are in gear with each other by means of toothed quadrants 226 mounted on their pivot pins. A driving crank 230 is pivoted to the rod 231 which at its lower end is hinged to the lever 232, Fig. 4. This lever is adapted to rock upon the bolt 211 and carries the anti-friction bowl 233 which is operated by the cam 234 mounted on the shaft 613.

When the bag has arrived at the station VII, it is raised into the working range of the above described folding and pressing device. This is effected by a lifting mechanism constructed like the lifting device 315, 316 illustrated in Fig. 16 and described hereinafter. During the ascent of the bag, the press jaws 215 and 216 are moved so far apart that the ends of the respective sides of the bag are able to enter between the jaws 215 and 216 and the plates $215^a$ and $216^a$.

These members occupy in their inoperative condition the position shown in Fig. 10 for the purpose of ensuring the entry of the bag with respect to the plates $215^a$ and $216^a$ even in the event that the upper cross-section of the bag should have become deformed. Now the folding knives 200, 201 are moved inwards in order to fold or crease the adjacent ends of the bag. Simultaneously, the press plates 215 and 216 are moved inwards, whereby the adjacent walls of the bag are forced inwards and pressed against the folding knives. By the cooperation of the folding knives with the inner plates $215^a$ and $216^a$ sharp folding creases are produced at the outer edges of the folds. The folding knives 200, 201 are then swung outwards again, whereupon a further inward movement is imparted to the folding plates 215, 216 in order to exert a further pressure upon the just folded portion of the bag. As the inner plates $215^a$, $216^a$ are resiliently displaced in their guides, sharply pressed edges will thus be obtained and a return of the folds into the original cross-sectional shape of the bag will be effectively prevented.

The station VIII remains idle.

At the station IX, Figs. 4, 14 and 15, takes place a repressing of the prefolded upper portion of the bag by a mechanism which likewise comprises two pressing jaws 250 and 251 bent at an angle, which are pivotally mounted in the pairs of double levers 252, 253. These levers are adapted to rock on bolts 254 and 255 mounted in the bearing arm 256 clamped to the pillar 260. The upper ends of the pairs of levers 252, 253 are loosely pivoted to levers 261, 262. The latter levers are adapted to turn freely upon the bolts 263 inserted in the bracket bearing 264. The bearing 264 is capable of sliding freely upon the pillar 260 and is secured against turning by a guide pin 265 which is vertically guided in a sleeve 266 of the bearing 256 clamped to the pillar 260. The bearing 264 is provided with an eye 267 from which the bolt 265 projects with its upper end and is there engaged by a nut 268.

A further eye 270 on the bearing 264 is pivotally connected to a rod 271 connected to the lever 272 adapted to rock upon a bolt 270. The bolt 273 is screwed into the bearing block 274. The bowl 275 journaled at the other end of the lever 272 rests upon the circumference of the cam 276 mounted on the shaft 613. By the said double connecting levers a toggle-joint is produced so that, when the rod 271 is moved downwards, the toggle-joint is spread apart at its upper part and its lower part with the press-jaws is forced together.

The easily turning jaws 250, 251 adapt themselves closely to the folded portions of the bag and exert a strong pressure upon the creases.

When the bag has arrived at the station X, the flattened portion of the bag is folded together. This may take place in any suitable manner, for instance by a repeated folding of this portion of the bag. In the case illustrated, the folding takes place by rolling up, for which purpose is employed the device illustrated in Figs. 4, 16, 17 and 18, for instance.

An auxiliary and adjusting pair of tongs is provided, which consists of the two legs 300, 301. These are mounted upon the bolts 302, 303 adapted to turn in the vertical bores of an arm 304 (Fig. 17) which is also indicated in Figs. 4 and 18 by dotted lines and which is secured by its slotted sleeve 304 to a vertical rod 304ᵇ suitably mounted on the machine frame. The bolts 302, 303 carry at their lower ends pinions 305, 305′ which mesh with each other, the wheel 305 being driven by a rack 306. The rack is adapted to slide in a guide 307 which is formed on the under side of said arm 304 and is connected to a bell-crank lever 308 rotatable around the shaft 309. The free end of said lever 308 is engaged by a rod 310 which is connected to the lever 311 adapted to rock upon the shaft 312. A bowl 313 upon said lever bears upon the circumference of the cam 314 keyed to the shaft 610.

Below the above mentioned supporting rail 181 for the bag, there is provided a lifting device which consists of the two angles 315 and 316 secured at their lower ends to a guide rail 317. The guide rail slides in a suitable guide 318 and carries at its lower end an eye 319 at which a connecting rod 320 is pivotally mounted which at its other end is pivoted to the lever 321. The lever 321, Fig. 22, turns upon the pin 322 and is provided with a bowl 323 which cooperates with the cam 324 mounted on the shaft 610.

Above the auxiliary tongs 300, 301, there are mounted the rolling-up or folding tongs 340 and 341 located opposite each other in such a manner as to be capable of being moved forward from an outer inoperative position, not shown, inwards around the flattened out end portion of the bag. Each pair of tongs consists, according to Figs. 19-21, of the legs 342 and 343 adapted to rock upon the pivot pin 344. The legs of the tongs are designed as double levers which at opposite ends are provided with rollers 345 and 346 contacting with a cylindrical bushing 347. The pin 344 rests in a forked bearing 348 rigidly mounted on the shaft 349 of the tongs. On the shaft 349 is keyed a spur wheel 351, Fig. 18, which meshes with a spur wheel 352 mounted on the shaft 353 journaled in the bearing 350. With the spur wheel 352 gears a toothed quadrant on the lever 354, Fig. 17, which lever is adapted to rock upon the stationary bolt 355 screwed into the bearing pedestal 356.

The other end of the toothed quadrant lever is engaged by a rod 360 which is pivoted to the lever 361 adapted to rock upon the bolt 362 and to be operated through a bowl by the cylindrical cam 363 keyed to the shaft 610. The other tong 341 is identical with the one just described as far as the construction and drive is concerned. Its drive is effected by the shaft 353 through the telescopic tube 365 and the bolt 366 fixed in this tube. On this bolt is keyed the pinion 367 which gears with the pinion 368 mounted on the shaft of the tongs. As the tongs must be moved from the outside towards the inside and must be also withdrawn again from the rolled up bag portion, the transmitting shafts 353, 365 and 366 are telescopically displaceable one in the other. The shaft 353 is provided with two opposite flat surfaces 353′ and 353″. The tube 365 carries correspondingly shaped counter-surfaces 365′ and 365″ so that rotation of the shaft together with the tube is ensured in spite of the longitudinal displacement of the two parts in relation to each other. For the purpose of effecting the mutual displacement of the tongs, the bearings 350 and 380 are, as shown in Fig. 23, provided with bolts 385 and 386 which are fixed in the bearing 387. The bearing 387 is rigidly mounted on the bearing pedestal 356. The bearings 350 and 380 carry rods 390 and 391 hinged to a lever 392 pivotally mounted on the pin 388 of the stationary bearing 387. To the lever 392 is pivoted a connecting rod 393 hinged at its other end to a bell-crank lever 394. The other end of this bell-crank lever 394 is connected to the rod 395, Fig. 16, and the lever 396 at the free end of which a bowl 397 is provided which cooperates with the cam 400 mounted on the shaft 610.

The following mechanism serves for opening and closing the tongs:

The annular bushing 347 is engaged by a sliding pin 420, Figs. 16, 17, 25, fixed upon the cranked lever 421 pivotally mounted on the bearing 350 at 422. At the other end of this lever is provided a bowl 423 which rests upon a switch-tongue 424 pivotally mounted upon the stationary bearing 387 by means of a stud 425. Upon the stud 425 is fixed a crank 426 to which is hinged a rod 427 which at its other end engages the bell-crank lever 428 journaled upon a shaft 309. The free end of this bell-crank lever carries a connecting rod 429 engaging a lever 430 provided at its end with an anti-friction bowl 431 and adapted to be operated by a cam 432 mounted on the shaft 610. Upon the stud 425 there is also fixed a second switch tongue 440 against which abuts the roller 441 of the cranked lever 442 which is adapted to rock upon the pin 443 of the movable bearing 380 and engages the sleeve of the other tong by means of a pin 444.

This mechanism operates in the following manner:

After the arrival of the bag at the station X, the bag is lifted off the guide rail 181 by the pushers 315, 316 and 317 and raised to such a height that the folding tongs 340, 341 will be in alignment with the upper edge of the package, the flattened out portion of the bag entering between the legs of the spread apart auxiliary tongs 300, 301.

Simultaneously with the lifting of the bag, the auxiliary tongs 300, 301 are closed and align the folded end portion of the bag accurately in such a manner that the opposite edges of the portion of the bag to be folded are in accurate alignment. In Fig. 18 of the drawings, the rolling-up tongs 340, 341 are shown in their inner closed position so that they enclose the upper edge of the package with the affixed metal strip 40. After this has been accomplished, the auxiliary tongs 300, 301 are opened again. Then the lever 354, with the toothed sector is set in motion, and the rolling-up motion is carried out by the spur wheels 352, 353 and 367, 368. Since the distance from the upper edge of the bag to the level of its contents decreases during this process, the bag is raised by the lifter described above in the direction of the rolling-up tongs. After completion of this process, a holding-down device for the folded part, more fully described hereafter, is set in operation, and the rolling tongs are withdrawn from the folds. This takes place by the said switch tongues 424 and 440 being swung around the bolt 425 by their operating mechanism described so that the switch tongue 424 raises the roller 423 and the switch tongue 440 depresses the roller 441. In this way, the two levers 421 and 442 are rocked, whereby the two annular bushings of the tongs are moved inwards. These bushings press upon the rollers 345, 346 and correspondingly also upon the inner tongs, so that the legs of the tongs are slightly opened. Directly after this process, the bearings 350 and 380 at which the rolling-up tongs are journaled, are moved outwards by means of the operating levers described, so that the slightly opened tongs are withdrawn from the rolled up portion of the bag. The lever 354 with the toothed quadrant is then swung in the opposite direction, until it reaches its initial position. Then the two bearings 350, 380 of the tongs are again moved inwards, the switch tongues 424 and 440 raising or lowering the rollers 423 and 441 still further, so that the tongs are again widely opened thereby and are ready again for the next bag fed forward. When this next bag has been correspondingly aligned by the auxiliary tongs 300, 301 and been brought within the reach of the main tongs, the switch tongues 424 and 440 are swung back into their position shown in Fig. 16, so that the two bushings release the rollers of the tongs and the tension spring connected with both legs of the tongs is able to become operative and to close the tongs.

To secure the rolled up portion of the bag in its state, there are provided two angular pressing-down levers 450 (Fig. 26) and 451 rounded at the front. These levers are mounted upon the shaft 452 which carries a crank 453, Fig. 17, at its outer end. With this crank is connected a rod 454, shown in Fig. 17, which at its lower end is pivotally secured to the lever 455 adapted to rock upon the pivot pin 456 and controlled by a cam 457 keyed to the shaft 610 with the circumference of which it contacts by means of a suitable bowl. As soon as the rolling-up of the projecting portion of the bag has been completed, these two pressing down levers are moved downwards and made to rest upon the rolled-up portion of the bag.

The closed bag is then fed to station XI. During this feed, the projecting ends 40' of the metal strip are bent up by a suitable mechanism while the final folding down on the rolled-up portion is performed at station XI. The bag held by the pressing down levers 450, 451 first passes underneath the two rails 460 extending parallel to each other by which it is held throughout the entire further operation.

During the feed of the bag along the path from station X to station XI, suitable pushing members become operative against the projecting ends of the metal strip which in the case illustrated consist of angularly bent plates 463 and 464, Figs. 4, 27, 28, 29, fixed to the rails 461 and 462. The rails 461 and 462 are adapted to slide in the guides 465 and 466. At the pins 467 and 463 fixed at said rails engage levers 469 and 470 keyed to the shaft 471. At one end of this shaft is by means of a pin fixed a crank 472, Fig. 4, which carries a roller 473. A push rod 475 carries at its upper end a stop 476 and is guided in a bearing 477 of the machine framing. At its lower end is mounted a block 478 which carries a connecting rod 479 which is connected to an arm 480 at its lower end. This arm is rigidly secured to a shaft 481 which at its other end carries a crank 482 which is connected to a rod 483 cooperating with the cam 484 arranged upon the shaft 610. Between the bearing 477 and the block 478 there is located a compression spring 485 which tends to draw the block 478 and thus also the push rod 475 downwards. As soon as the bag with the projecting ends 40' of the metal strip 40 passes above the push members 463, 464, the rod 475 is suddenly knocked upwards so that the stop 476 knocks against the roller 473 and thus the push members 463 and 464 move quickly upwards through the agency of the connecting gear described so that the projecting ends 40' of the metal strip 40 are bent upwards under an angle to the strip. The rails 460 serve as abutments.

After the package has arrived at station XI, the bent up ends of the strip are finally folded down upon the rolled up portion of the bag. This is in the present case done by two folding rollers 492 and 493 mounted on levers 490 and 491. These levers rock on pivot pins 494 and 495 and are geared together by toothed quadrants 496. On the pivot pin 495 is fixed a crank 497 which carries a roller 498. Upon this roller rests a stop 499 which is secured to the arm 500 so as to form an angle therewith. The arm 500 is clamped to the push-rod 501 which is guided in the bearing 477. The transmitting gear cooperating with the cam 510 is designed in the same manner as described before with reference to the push-rod 475. A compression spring 502 has the tendency to maintain the push-rod 501 in its highest position. At station XI, the guide rails 460 are bevelled as shown in Fig. 29 at 460', so that they have knife edges. By a jerky movement, as described above, the flattening down rollers 492 and 493 are moved inwards and thereby fold the bent-up ends of the metal strip 40 around the said knife edges 460' of the rails 460.

Two compression springs 490' and 491' mounted at the upper free ends of the levers 490 and 491 serve to return the levers into their initial position after they have folded over the ends 40' of the metal strip 40.

At station XII takes place the ejection or discharge of the closed package from the conveyor mechanism, in known manner, on to a delivery belt 740 which carries the individual packages through a finishing presser which again forces the turned over ends of the metal strip rigorously down upon the package. The belt or apron 740 runs in known manner around pulleys 741 and 742 journaled in the side frames 743 and 744. After the departure from the station XI, the rolled-up fold is released from the guide rails 460 above mentioned, so that the folded portion rights itself. The delivery mechanism consists of an arm 745 pivotally connected to a link 747 at 746. This link is mounted upon the bolt 748 upon which is also fixed the arm 749. This arm is engaged by a rod 750 which is operated from a suitable cam gear in well known manner in such a way that the package is discharged from the conveyor receptacle at station XII on to the belt 740 and passes along between two lateral guide rails 751 and 752.

The final pressing mechanism consists of the two pressing discs 520, 521, Figs. 4 and 30. These discs are adapted to revolve in the bearings 535 and 523 by means of the spindles 532 and 522. The disc 521 is driven by the bevel wheel 524 keyed to the upper end of its supporting spindle 522 and meshing with the sprocket wheel 526. The chain 754 runs over a tensioning sprocket wheel 755 to a sprocket 756 mounted on the shaft 610 by which the sprocket 526 is rotated. Upon the spindle 522 is also mounted the spur wheel 530 which meshes with the spur wheel 531 keyed to the spindle 532 of the press disc 520.

The bearings 523 and 535 are provided with clamping eyes 540, 541, 542 and 543, adapted to be adjusted and fixed along the bolts 544 and 545. These are at both ends likewise mounted in clamping eyes 546, 547, 548 and 549 which are adjustably clamped upon the four bolts 550, 551, 552 and 553. As will be obvious from the drawings and the above description, the press discs 520 and 521 may by displacement of the said individual clamping eyes be adjusted as regards their height as well as their spacing, so that when the upstanding portions of the package pass through between the discs 520 and 521, they are strongly pressed together in a reliable manner.

It will be readily understood that various structural modifications may be made in the machine without departing from the spirit of my invention and the scope of the appended claims.

I claim as my invention:

1. In a machine of the type specified, in combination, means for filling the bags, means for affixing a strip of flexible material to one flap of the upper end portion of the bag parallel to the upper edge of the same in such a manner that said strip extends at both ends beyond said flap, means for flattening down said flap and the opposite flap, means for folding together the flattened out portion of the bag, and means for bending the projecting ends of the flexible strip over the folded end portion of the bag.

2. In a machine of the type specified, in combination, means for filling the bags, means for affixing a strip of flexible material to one flap of the upper end portion of the bag at the upper edge of the same in such a manner that it projects at both ends beyond said flap, means for flattening out and pressing said flap and the opposite flap while simultaneously creasing inwards the two other flaps, means for folding together the flattened out flaps, and means for bending the projecting ends of the strip over the folded end portion of the bag.

3. In a machine of the type specified, in combination, means for filling the bags, means for affixing a strip of flexible material at one flap of the upper end portion of the bag along the upper edge of the same in such a manner that said strip projects at both ends beyond the flap, means for creasing inwardly the two flaps located transversely to said flap, means for laying the flap provided with the strip and the opposite flap against one another and to press them down, means to bend the projecting ends of the strip around the folded end portion of the bag, and means for pressing the bent over ends of the strip against the end portion of the bag.

4. In a machine of the type specified, in combination, means for filling the bags, means for conducting a strip of flexible material intermittently to the bag to be closed along the upper edge of a flap of the empty end portion of the filled bag, in such a manner that the front end of the said strip projects a certain distance beyond the bag, means for fastening the strip to this flap of the end portion, means for severing the strip a certain distance in front of the bag, means for placing this flap and the opposite flap flatly against each other, means for folding together the flattened part, and means for bending the projecting ends of the strip over the folded end portion of the bag.

5. In a machine of the type specified with a plurality of working stations, in combination, apparatus for intermittently feeding the bags to said working stations, means comprising a pair of cooperating feed rollers for feeding a strip of flexible material transversely to the feed path of the bag along the upper edge of one side of the bag, means for intermittently rotating said feed rollers in such a manner that the leading end of the said strip projects after each feed by a certain distance beyond the bag, means for affixing said strip to the adjacent edge of the bag, means for severing said strip at a certain distance in front of the bag, means for filling the bag, means for flattening the flap provided with said strip and the opposite flap of the empty end portion of the filled bag, means for folding together said end portion, and means for folding the projecting end of the strip over this end portion.

6. In a machine of the type specified with a plurality of working stations, in combination, mechanism for intermittently feeding the bags to the working stations, a device comprising a feed table with two cooperating feed rollers for feeding a strip of flexible material upon said table transversely to the feed path of the bags along the upper edge of one side of the bag, means for intermittently rotating said feed rollers in such a way that the leading end of the said strip projects beyond the bag by a certain distance after each feed step, means for guiding and straightening the strip prior to its entrance between the said feed rollers, means for attaching the strip to the adjacent edge of the bag, means for severing the strip a certain distance in front of the bag, means for filling the bag, means for flattening the flap provided with the strip and the opposite flap of the empty end portion of the filled bag, means for rolling up said end portion of the bag, and means for turning the projecting ends of the strip over this end portion of the bag.

7. In a machine of the type specified with a plurality of working stations, in combination, mechanism for intermittently feeding the bags to the working stations, a device comprising a feed table with two cooperating feed rollers for feeding a metal strip upon the table, transversely to the direction of feed of the bags, along the upper edge of one side of the bag, means for intermittently rotating said feed rollers in such a way that the leading end of the metal strip projects a certain distance beyond the bag after each feed, means comprising adjustable rollers at both sides of the metal strip for laterally guiding and straightening the metal strip prior to its entrance between the said feed rollers, means for securing the metal strip to the adjacent edge of the bag, means for severing the metal strip at a certain distance in front of the bag, means for filling the bag, means for flattening the flap provided with the metal strip and the opposite flap of the empty end portion of the filled bag, means for rolling up said end portion, and means for folding the projecting ends of the metal strip around this end portion of the bag.

8. In a machine of the type specified with a plurality of working stations, in combination, mechanism for intermittently feeding the bags to the working stations, means for intermittently feeding a metal strip, transversely to the direction of feed of the bags, along the upper edge of one side of the bag in such a way that the leading end of the metal strip projects a certain distance beyond the bag after each feed, means for securing the metal strip to the adjacent edge of the bag comprising a punching device consisting of a male and female die so constructed and arranged that portions of the metal strip are pushed through the adjacent edge of the bag and bent around it, means for lifting the punching device out of the range of the bag and to lower it so far that the female and the male dies grip the metal strip and the adjacent edge of the bag, means for severing the metal strip a certain distance in front of the bag, means for filling the bag, means for flattening the flap provided with the metal strip and the opposite flap of the empty end portion of the bag, means for rolling up this end portion, and means for folding the projecting ends of the metal strip over this end portion of the bag.

9. In a machine of the type specified with a plurality of working stations, means for intermittently feeding the bags to the working stations, means for intermittently feeding a metal strip, transversely to the feed path of the bags, along the upper edge of one side of a bag in such a way that the leading end of said metal strip projects a certain distance beyond the bag after each feed, means for securing the metal strip to the adjacent edge of the bag comprising a support adapted to be vertically displaced, a slide carrying a plurality of punching tools, and means to displace the slide horizontally in a guide of the support towards the said side of the bag, said punching tools cooperating with punching holes in a rail fixed to the said support in a manner to push portions of the metal strip through the adjacent edge of the bag and to bend them around it, means for lifting the said support with the punching means out of the range of the bag and to lower the support so far that the punching means are allowed to grip the metal strip and the adjacent edge of the bag, and means for severing the metal strip a certain distance in front of the bag.

10. In a machine of the type specified, with a plurality of working stations, in combination, means for intermittently feeding the bags to the working stations, means for intermittently feeding a metal strip, transversely to the feed path of the bags, along the upper edge of one side of a bag in such a way that the leading end of the metal strip projects a certain distance beyond the bag after each feed, means for securing the metal strip to the adjacent edge of the bag comprising a support adapted to be vertically displaced, a slide carrying a plurality of punching tools, and means to displace the slide horizontally in a guide of the support towards the said side of the bag, a rail fixed to the said support and having punching holes cooperating with said punching tools to push, at a forward stroke of the slide, portions of the metal strip through and bend them around the adjacent edge of the bag, and further comprising a pressing plate provided at the said slide beneath the punching tools and adapted to press, at another forward stroke of the slide, the said edge of the bag with the metal strip secured to it against a pressing plate provided beneath the fixed rail with the punching holes, means for operating the said support so as to lower it, from its upper inoperative position with the punching and pressing means above the range of the bags, into its lowest position in which the punching means are allowed to operate, then to lift the support to an intermediate position in which the pressing means are allowed to operate, and then to lift the support again into its upper inoperative position, and means for severing the metal strip a certain distance in front of the bag.

11. In a machine of the type specified with a plurality of working stations, in combination, means for intermittently feeding the bags to the working stations, means comprising two cooperating feed rollers for feeding a metal strip, transversely to the direction of feed of the bag, along the upper edge of one side of the bag, means for operating said feeding rollers intermittently in such a manner that the leading end of the metal strip projects by a certain length beyond the bag after each feed, said driving means comprising a ratchet wheel and an intermittently operated pawl, means adapted to throw said pawl out of engagement with said ratchet wheel and controlled by a rocking feeler lever which in front of the station for feeding the metal strip extends into the feed path of the bags in such a manner that, if the said feeler is swung aside by a bag, the said means for throwing out the pawl are thrown out of their working position, while they maintain this position if the feeler is not swung out by a bag, means for attaching the metal strip to the adjacent edge of the bag, means for severing the metal strip at a certain distance in front of the bag, means for filling the bag, means for flattening the flap provided with the metal strip and the opposite flap of the empty end of the filled bag, means for rolling up this end portion of the bag, and means for folding the projecting ends of the metal strip around this end portion of the bag.

12. In a machine of the type specified with a plurality of working stations, in combination, means for intermittently feeding the bags to the working stations, means comprising two cooperating feed rollers for feeding a metal strip, transversely to the direction of feed of the bags, along the upper edge of one side of the bag, means for intermittently driving said feed rollers in such a way that the leading end of the metal strip projects by a certain length beyond the bag after each feed, said driving means comprising a ratchet wheel, a bow adapted to be swung concentrically to said ratchet wheel, an intermittently reciprocated pawl kept out of engagement with said ratchet wheel by said bow, a pivotally mounted feeler lever, connecting means between said bow and said lever, said lever located in front of the station for feeding the metal strip and projecting into the path of the bag in such a way that if the feeler lever is swung out of its normal position by an advancing bag, it swings said bow out of its operative position, and that, if the feeler lever is not swung out of its normal position by a bag, the bow retains its operative position in which it keeps the pawl out of engagement, means for securing the metal strip to the adjacent edge of the bag, means for severing the metal strip at a certain distance in front of the bag, means for filling the bag, means for flattening the flap provided with the metal strip and the opposite flap of the empty end portion of the filled bag, means for rolling up this end portion, and means for turning the projecting ends of said metal strip over said rolled up end portion.

13. In a machine of the type specified with a plurality of working stations, in combination, a mechanism for intermittently feeding the bags to the working stations, means for attaching a metal strip projecting at both ends to the upper edge of a side of the bag located transversely to the direction of feed of the bags, means for filling the bag, means for flattening the flap provided with the metal strip and the opposite flap of the empty end portion of the bag, means for rolling up this end portion, and means for folding the projecting ends of the strip over the rolled up end portion, said means for flattening said flaps of the empty end portion comprising two knife-like folding members adapted to crease the two other flaps inwards, and two angularly shaped folding plates adapted to fold the two first named flaps flatly against one another.

14. In a machine of the type specified, with a plurality of working stations, in combination, means for intermittently feeding the bags to the working stations, means for attaching a metal strip projecting at both ends at an upper edge of the bag located transversely to the direction of feed of the bag, means for filling the bag, means for flattening the flap provided with the metal strip and the opposite flap of the empty portion of the filled bag, means for rolling up said end portion, means for bending the projecting ends of the strip around the rolled up end portion, said means for flattening said flaps comprising two knife-edged folding members adapted to crease the two other flaps inwards, and two angularly shaped folding plates adapted to fold the two first named flaps flatly against each other, and two press-plates similarly shaped to said folding plates located at a following working station and adapted to press the flattened out flaps against each other.

15. In a machine of the type specified with a plurality of working stations, in combination, means for intermittently feeding the bags to the working stations, means for fastening a metal strip projecting at both ends to the upper edge of a side of the bag located transversely to the direction of feed of the bags, means for filling the bags, means for flattening out the flap provided with the metal strip and the opposite flap of the empty end of the filled bag, means for rolling up of said end portion, and means for bending the projecting ends of the strip round the rolled up end portion, said rolling up means comprising tongs adapted to be closed in the manner of scissors and to press together the flatly folded end portion at its lower end, and above said tongs two reciprocating rotatable tongs adapted to close themselves around the upper edge of the flatly folded end portion at both ends of the same and to roll up this end portion, and means for raising the bag in correspondence with the rolled up part of this end portion of the bag.

16. In a machine of the type specified with a plurality of working stations, in combination, means for intermittently feeding the bags to the working stations, means for securing a metal strip projecting at both ends at the upper edge at a side of the bag located transversely to the direction of feed of the bag, means for filling the bags, means for flattening the flap provided with the metal strip and the opposite flap of the empty end of the bag, means for rolling up said flattened end portion, and means for bending the projecting ends of the strip about the rolled up end portion, said rolling up means comprising tongs adapted to press together the said flattened end portion at its lower end and above said tongs two reciprocable and rotatable tongs adapted to close about the upper edge of the flattened end portion at both ends of the same and to roll up this end portion, means for raising the bag in correspondence with the rolling up of this end portion, and located above said tongs vertically reciprocable press-members adapted to place themselves, after the withdrawal of the folding tongs, upon the ends of the rolled up end portion and to hold it down.

17. In a machine of the type specified with a plurality of working stations, in combination, means for intermittently feeding the bags to the working stations, means for fixing a metal strip projecting at both ends to the upper edge of a side of the bag located transversely to the direction of feed of the bags, means for filling the bag, means for flattening the flap provided with the metal strip and the opposite flap of the empty portion of the bag, means for rolling up this end portion, means for bending the projecting ends of the metal strip down upon the rolled up end portion, the latter means comprising two push members adapted to be raised and lowered one of which is located at the outside and the other at the inside of the feed path described by the bags in such a way that the bag with the two ends of the strip projecting transversely to the feed path passes over these push members, operating gear for said push members controlled in such a manner that they turn the projecting ends of the strip upwards, and means for laying the upright ends of the strip down upon the rolled up portion of the bag.

18. In a machine of the type specified with a plurality of working stations, in combination, means for feeding the bags intermittently to the said working stations, means for securing a metal strip projecting at both ends to the upper edge of a side of the bag located transversely to the direction of feed of the bags, means for filling the bag, means for flattening the flap of the bag provided with said metal strip and the opposite flap of the projecting empty end portion of the bag, means for rolling up said end portion, means for bending the projecting ends of the metal strip around the rolled up end portion of the bag, said means comprising two push members adapted to be raised and lowered, one of said members located at the outside and the other at the inside of the path described by the advancing bags in such a way that the bag passes with the ends of the strip projecting transversely to the feed track over said push members, operating gear for said push members, means for controlling said gear in such a way that said push members turn the projecting ends of the strip into a substantially vertical position, members adapted to turn the upright ends of the strip inwards and down upon the top of the rolled up end portion of the bag, said member consisting of two swinging rollers in cooperation with stationary rails for holding down the rolled up end portion of the bag, the operating gear for said swinging rollers adapted to be controlled in such a way that, after the ends of the strip have been turned into the upright position, the said rollers move inwards and turn the ends of the strips around the knife edges of said stationary rails.

19. In a machine of the type specified with a plurality of working stations, in combination, means for intermittently feeding the bags to the working stations, means for securing a metal strip projecting at both ends beyond the bag at the upper edge of a side of the bag located at right angles to the direction of feed of the bags, means for filling the bag, means for flattening the flap provided with the metal strip and the opposite flap of the empty end portion of the bag, means for folding together said end portion, means for bending the projecting ends of the strip over the rolled up end portion of the bag, means for pressing the bent over ends of the strip against the end portion, the latter means consisting of two rotatable presser discs arranged above the path of the bag in such a manner that the rolled up end portion in upright position is able to pass between them, in cooperation with an operating gear for said discs by which they are turned in correspondence with the feed of the bag travelling past them.

20. In a machine of the type specified, in combination, means for riveting a strip of flexible material to one flap of the upper end portion of the bag to be closed and parallel to its upper edge so as to project at both ends beyond said flap, means for folding said flap and the opposite flap together, and means for bending the projecting ends of the strip over the folded end portion.

21. In a machine of the type specified, in combination, means for feeding a continuous band of flexible material intermittently on to the bag to be closed along the upper edge of a flap of the upper end portion of the bag in such a way that the front end of the said band projects beyond the bag, means for securing the end of the band fed by the side of the flap to the said flap by riveting, means for cutting off the band in front of the bag, means for laying flat this flap and the opposite flap of the empty portion against each other and for folding simultaneously the other two flaps, means for folding the empty portion together, and means for turning over the ends of the cut off end of the band.

22. In a machine of the type specified, in combination, means for feeding intermittently a continuous band of flexible material on to the bag to be closed along the upper edge of a flap of the upper end portion of the bag in such a way that the front end of the said band projects beyond the bag, means for securing the end of the band fed by the side of the said flap to this flap and adapted to punch out in the said end of the band tongues and simultaneously to pierce the said flap by these tongues and to bend down the tongues against the inner face of the flap, means for cutting off the band in front of the bag, means adapted to lay this flap and the opposite flap of the upper portion flat against each other and to fold simultaneously the other two flaps, means adapted to fold the empty portion together, and means for turning over the ends of the cut off end of the band.

PAUL GANGLER.